Patented June 1, 1937

2,081,935

UNITED STATES PATENT OFFICE 2,081,935

REFRACTORY INSULATION

Otis L. Jones, Joliet, Ill., assignor, by direct and mesne assignments, of one-half to The Illinois Clay Products Company, Joliet, Ill., a corporation of Illinois, and one-half to F. E. Schundler & Company, Inc., Joliet, Ill., a corporation of Illinois No Drawing. Application July 9, 1934, Serial No. 734,428

6 Claims. (Cl. 106—18)

This invention relates to refractory insulation and the like, and, among other objects, aims to provide an improved refractory insulating material of high insulating efficiency and capable of withstanding high temperatures.

The invention may be readily understood by reference to the following described refractory insulating material embodying the invention.

An efficient insulating refractory is valuable, among other uses, as a lining for high temperature furnaces and the like not only because it reduces heat loss through conduction and radiation, but its substantially lower heat capacity as compared with ordinary refractories (such as silica brick) reduces the time (and of course the fuel) consumed in bringing the furnace up to heat to from one-fourth to one-sixth of the time ordinarily necessary. The lower heat input necessary to maintain furnace temperatures brings about a substantial reduction in stack loss, and also permits heating methods, such as atmospheric gas burners, not capable of the high heat input required for ordinary furnaces. The index of insulating efficiency of a refractory insulation therefore greatly underrates the savings and advantages accruing from the use of a satisfactory insulating refractory. Many other benefits ensue from the use of an insulating refractory such as thinner walls, lighter furnaces and better working conditions. For uses other than in furnaces, such as linings for ladles, corresponding analogous advantages ensue from the use of a satisfactory insulating refractory. However, few materials possess even the minimum qualifications necessary for an insulating refractory.

Generally, insulating materials which are efficient insulators at low temperatures cannot be satisfactorily or practically employed in structures subject to high temperatures either because they cannot resist high temperatures or because they lose their insulating efficiency at high temperatures and instead become conductors. On the other hand, refractory materials, i. e., materials capable of resisting high temperatures such as are encountered for example in open hearth and other furnaces, have such low insulating efficiency as to fall almost in the class of heat conductors. For example, the "K factor" (the measure of insulating efficiency) of silica and other refractory brick is six to nine or even higher. Indeed, refractory brick of this character conduct heat so readily as to render many mineral insulating materials (capable of resisting moderately high temperatures, i. e., about 600° F.) unsuitable for use as insulators for high temperature furnaces, even when protected by a thick wall of such refractory brick.

Many insulating materials, such as diatomaceous earth, which are refractory to some extent are inherently weak or cannot easily be bound into strong blocks and the like. Moreover, the conventional binding material used actually reduces the fusion point of the insulating material and thereby renders the block or other form of insulation still less refractory.

Heretofore the insulating efficiency of a refractory insulation has depended almost entirely on the porosity of the material, with the result that increase in insulating efficiency was accompanied by a loss of strength of the material. Moreover, such materials cannot be installed until they have been subjected to an expensive burning at very high temperatures to develop the ceramic bond for holding the material together. The high burning temperatures necessary for material of this character generally produce such shrinkage and deformation as to make it impossible to produce a properly dimensioned or shaped brick, and it is therefore generally the practice to make the brick or block greatly oversize and saw them to size after burning. The necessity for burning at high temperatures practically limits the material to use in block or brick form. In such ceramic materials, a secondary shrinkage usually occurs in service.

The illustrative refractory insulation embodying the present invention is unique in that it combines high insulating efficiency and light weight with high fusion point and strength without preliminary burning, thus providing a true insulating refractory capable of use in many instances both as a refractory brick or lining and as an insulator. The material is characterized by the combination of exfoliated vermiculite with a binding substance which has the property of substantially raising the fusion point of the vermiculite.

Exfoliated vermiculite is an alteration product of certain micaceous minerals, such as biotite, which exfoliate or expand to many times their original size upon the application of heat to produce a granular insulating material both highly refractory and extremely light in weight (about six pounds per cubic foot). Its natural fusion temperature is about 2500° F. Its insulating efficiency at high temperature depends not alone on porosity, but upon the heat reflecting action of the multitude of minutely separated polished surfaces which characterize the structure of the particles or granules.

It has been discovered that the addition of magnesium oxide, such as caustic magnesium oxide in a very fine state of subdivision, to the exfoliated vermiculite has the effect of increasing its fusion point to about 3000° F. It has further been discovered that the increased fusion point of vermiculite is also attained when the magnesium oxide is present in the form of magnesium oxysulphate cement. The latter cement provides an extremely strong crystalline bond which, unlike ceramic insulating refractories, develops promptly on setting of the cement and without the burning required by ceramic binders. Preforming into blocks or bricks is therefore unnecessary; the material can be applied in plastic form as a coating or lining of any desired thickness, to a supporting wall or other structure. Moreover, the crystalline bond thus provided has the highly desirable property of developing a basic character, thus making the material particularly advantageous for use in furnaces and the like having a basic slag or other basic reaction.

The addition of small quantities of certain other materials quite unexpectedly has the effect of still further increasing the fusion point of the material. For example, although asbestos has a relatively low melting point and in large quantities actually acts as a flux to reduce the fusion point, the addition of only 10% of asbestos (with a corresponding reduction in the amount of vermiculite) increases the fusion point of the material to about cones 35 and 36, namely, 3326° to 3362° F. Similarly, clay having a melting point of about 3000° F. (but which generally has the effect of reducing the fusion point) when added to the present material in small quantities up to about 10%, actualy raises the fusion point several hundred degrees above what it would be without the clay. Other high alumina clays, such as kaolin, bauxite, have similar effects. The aforesaid added materials need not be employed except where unusually high temperatures are to be encountered. Probably the added ingredients by incipient fusion with the magnesium oxide and vermiculite form higher fusion point compounds, as explained above.

When subjected to temperatures at which the magnesium oxysulphate is broken down (i. e. about 2000° F.), there is little change in volume of the material with some, though not objectionable, loss of strength. This, however, is offset by the creation of numerous additional minute air voids and materially increased insulating efficiency. Moreover, the insulating efficiency of the refractory is so high that high temperatures penetrate only a relatively thin surface layer leaving the main body of the material unaffected either by decomposition or shrinkage. The decomposed surface layer, under high temperatures, develops a vitreous bond.

Above 2000° F. the magnesium oxide remains in an extremely fine state of subdivision. The exact fineness is unknown, but it is very much finer than 250 mesh and of course much finer than its condition when originally mixed to form the magnesium oxysulphate cement. Its function in preventing fusion of the exfoliated vermiculite at temperatures substantially below 3000° F. does not require actual fusion of the magnesium oxide and exfoliated vermiculite. Incipient fusion between the magnesium oxide and exfoliated vermiculite apparently occurs, resulting in the formation of a compound having a much higher fusion, thereby preventing actual fusion of the exfoliated vermiculite. The incipient fusion is probably progressive on increasing temperatures, and when the fusion temperature (about 3000° F.) is finally reached, the entire material has been converted into the aforesaid compound having the fusion point of about 3000° F.

The magnesium oxysulphate binding material may be formed by the addition to caustic magnesium oxide of a solution of magnesium sulphate of about 28° Bé. in density in sufficient quantity to form a pulpy consistency suitable for molding or application as a cement. Increase in the density of magnesium sulphate solution up to a saturated solution has the effect of progressively increasing the minimum fusion point of the material somewhat but unless maximum fusion temperatures are desired, it is probably preferable to use a more dilute solution such as 28° Bé. A satisfactory material from the standpoint of insulating efficiency, refractoriness, strength and lightness, may be produced by employing 80% of exfoliated vermiculite, 20% of caustic calcined magnesite and 28° Bé. magnesium sulphate solution in quantities to make a plastic pulp. If other materials, such as clay, asbestos, etc., are added as aforesaid, only about 70% of vermiculite is used, the proportions of other ingredients remaining substantially the same.

The material may be originally prepared in dry form, that is, mixed with the proper proportions of exfoliated vermiculite, caustic calcined magnesite and dry magnesium sulphate crystals, and in such dry form delivered for use. With the addition of water, the material may be formed into a plastic pulp which may be molded or applied as a cement upon other surfaces.

The resultant product is not only capable of resisting temperatures up to about 3000° F., but it is an efficient insulator having a "K factor" of from two to three at about 2000° F., depending upon the amount of binding material employed. It is extremely light in weight and has a very low heat storing capacity compared to that of ordinary refractory walls made of silica brick, for example, thereby substantially reducing the enormous losses resulting merely from the absorption of heat by walls made of ordinary heavy refractory materials. Since its insulating efficiency is not dependent alone on porosity, but on the heat reflecting action of the multitude of polished cleavage surfaces of the vermiculite, it is much less permeable to gas flow and slag penetration than other insulating materials. Moreover, it is insensitive to temperature changes and is therefore adapted to the conditions of service characteristic of furnaces lined with insulating refractories where the low heat capacity of the furnace walls results in much more rapid temperature changes particularly in intermittent furnaces.

It should be understood that the inventive principles are not all limited to unburned materials, since an equally refractory material may be produced by burning the materials to about 2500° F. It is not essential in such cases that the magnesium oxide be provided in the form of magnesium oxy-sulphate cement, since the materials may preliminarily be bonded together by other bonding materials, such as a small percentage of clay, which will provide an adequate bond until a permanent bond is developed by burning. The aforesaid burned refractories may advantageously be employed in constructions where both faces of the refractory are subjected to high temperatures.

Obviously the invention is not limited to the details of the illustrative material since these may be variously modified. Moreover, it is not indispensable that all features of the invention be used conjointly since various features may be used to advantage in different combinations and subcombinations.

Having described my invention, I claim:

1. The method of making a refractory cement which is characterized by bonding together particles of exfoliated vermiculite with a magnesium oxy-sulphate cement, firing one face of the bonded material at temperatures exceeding 2000° F. to decompose the surface layer of cement at said face, while preventing substantial penetration of heat into the body of the material to prevent decomposition of the latter, increasing the temperatures to develop a ceramic bond in place of the decomposed cement and during the formation of said bond supporting said surface layer by the unaltered body of said material.

2. The method of making a refractory cement which is characterized by bonding together particles of exfoliated vermiculite with a magnesium oxy-sulphate cement, firing one face of the bonded material at temperatures exceeding 2000° F. to decompose the surface layer of cement at said face, protecting the other faces of the material from direct exposure to the heat, increasing the temperatures to develop a ceramic bond in place of the decomposed cement and during the formation of said bond supporting said surface layer by the unaltered body of said material.

3. The method of making refractory insulation bricks or the like for use at high temperatures which is characterized by bonding together particles of exfoliated vermiculite with magnesium oxy-sulphate cement, arranging the bricks or the like in close contact so as to expose only one face thereof to heat, then subjecting the exposed surface of the bricks to temperatures in excess of 2000° F. which decompose the cement in the exposed surface layer leaving basic magnesia, and continuing the heat to form a basic ceramic bond with said particles of vermiculite in said surface layer, and supporting said surface layer by the undecomposed body of the brick which is protected by said vermiculite from decomposing temperatures.

4. A refractory insulation of the character described comprising in combination a substantially thick body of particles of exfoliated vermiculite bonded together by a basic cement consisting of magnesium oxy-sulphate cement, the cement adjacent one face of said body being decomposed by firing to temperatures in excess of 2000° F. and the particles being bonded together by a ceramic bond formed at temperatures in excess of 2000° F., said vermiculite serving to insulate said body against deep penetration of the firing heat and decomposition of said cement.

5. The method of increasing the normal fusion point of exfoliated vermiculite which is characterized by binding particles of exfoliated vermiculite together with magnesium oxy-sulphate cement in intimate contact with the vermiculite, allowing the cement to set to bind the particles into a rigid mass, and then heating the product to temperatures in excess of 2000° F. which causes the magnesium oxy-sulphate cement to decompose, leaving magnesium oxide in intimate contact with the vermiculite to increase its normal fusion point.

6. A high temperature insulating material comprising in combination particles of exfoliated vermiculite and magnesium oxide which has been placed in intimate contact with the vermiculite in the form of magnesium oxy-sulphate cement and later decomposed at temperatures of about 2000° F. to leave magnesium oxide in finely divided condition and in intimate contact with the particles of vermiculite.

OTIS L. JONES.